United States Patent
Chang

(10) Patent No.: US 7,956,748 B2
(45) Date of Patent: *Jun. 7, 2011

(54) SYSTEM AND APPARATUS FOR SILENCING COMMUNICATION DEVICES

(75) Inventor: Wayne Chang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/582,042

(22) Filed: Oct. 20, 2009

(65) Prior Publication Data

US 2010/0041343 A1 Feb. 18, 2010

Related U.S. Application Data

(63) Continuation of application No. 11/735,332, filed on Apr. 13, 2007, now Pat. No. 7,626,504.

(51) Int. Cl.
*H04Q 5/22* (2006.01)
*G08B 13/14* (2006.01)
*H04W 24/00* (2009.01)

(52) U.S. Cl. ............ 340/572.1; 340/572.2; 340/572.3; 340/572.4; 340/572.5; 340/572.6; 340/572.7; 340/572.8; 340/10.5; 455/418; 455/456.1; 455/456.2; 455/456.3; 455/456.4; 455/567; 455/550.1

(58) Field of Classification Search .... 340/572.1–572.8, 340/10.5; 455/418, 456.1–456.4, 567, 550.1
See application file for complete search history.

(56) References Cited

U.S. PATENT DOCUMENTS

| | | | |
|---|---|---|---|
| 5,874,902 A | 2/1999 | Heinrich et al. |
| 5,991,614 A | 11/1999 | Oura |
| 6,011,973 A | 1/2000 | Valentine et al. |
| 6,574,471 B1 | 6/2003 | Rydbeck |
| 6,823,199 B2 | 11/2004 | Gough |
| 6,970,724 B2 | 11/2005 | Leung |
| 6,999,731 B2 | 2/2006 | Cronin |
| 7,149,512 B2 | 12/2006 | Connor |
| 7,248,885 B2 | 7/2007 | Benco et al. |
| 7,474,889 B2 | 1/2009 | Bhakta et al. |
| 2001/0006546 A1 | 7/2001 | Jung |
| 2003/0013495 A1 | 1/2003 | Oleksy |
| 2005/0170849 A1 | 8/2005 | McClelland |
| 2008/0006696 A1 | 1/2008 | Piersol et al. |

FOREIGN PATENT DOCUMENTS

| | | |
|---|---|---|
| GB | 2357217 | 6/2001 |
| KR | 20020016351 | 3/2002 |
| KR | 20050067344 | 7/2005 |
| WO | 0209393 | 1/2002 |

*Primary Examiner* — Benjamin C Lee
*Assistant Examiner* — Lam P Pham
(74) *Attorney, Agent, or Firm* — Moazzam & Associates, LLC

(57) ABSTRACT

A system and method for silencing communication devices is disclosed. A system that incorporates teachings of the present disclosure may include, for example, a silencing system having a controller element to transmit an RF signal to an RF receiver of a mobile communication device. An audible alerting function of the mobile communication device can be adjusted in response to the RF signal. Additional embodiments are disclosed.

20 Claims, 4 Drawing Sheets

100

SYSTEM AND APPARATUS FOR SILENCING COMMUNICATION DEVICES

CROSS-REFERENCE TO RELATED APPLICATIONS

This application is a Continuation application of U.S. patent application Ser. No. 11/735,332, entitled "System And Apparatus For Silencing Communication Devices," filed Apr. 13, 2007, and assigned to the same assignee as this application. The aforementioned patent application is expressly incorporated herein, in its entirety, by reference.

FIELD OF THE DISCLOSURE

The present disclosure relates generally to communication systems, and more specifically to a system and method for silencing communication devices.

BACKGROUND

Wireless communications has expanded to where mobile communication devices can be seen in virtually any location. Audible alerts for such devices can vary from the typical ring tone to various types of music. In certain venues, such audible alerts are deemed inappropriate or are prohibited. In other venues, use of the mobile communication device is deemed inappropriate or prohibited. Signage and other notices instructing users to adjust the communication devices to a silent or off state are not always effective, especially in high traffic areas.

A need therefore arises for a system and method for silencing communication devices.

DETAILED DESCRIPTION

Embodiments in accordance with the present disclosure provide a system and apparatus for silencing communication devices.

In a first embodiment of the present disclosure, a communication device can have a controller element to receive a silencing signal from an RFID device of the communication device. The RFID device can provide the silencing signal in response to an RF signal received from a remote RF transmitter. The controller element can also present one or more silencing options in response to the silencing signal, receive a selection corresponding to one of the one or more silencing options, and adjust an audible alerting function of the communication device responsive to the selection of the one or more silencing options.

In a second embodiment of the present disclosure, a silencing system can have a controller element to transmit an RF signal to an RF receiver of a mobile communication device. An audible alerting function of the mobile communication device can be adjusted in response to the RF signal.

In a third embodiment of the present disclosure, an RFID device can have a controller element to receive an RF signal from a remote RF transmitter, and provide a silencing signal to the mobile communication device in response to the RF signal. An audible alerting function of the mobile communication device can be silenced in response to the silencing signal.

Figure 1:
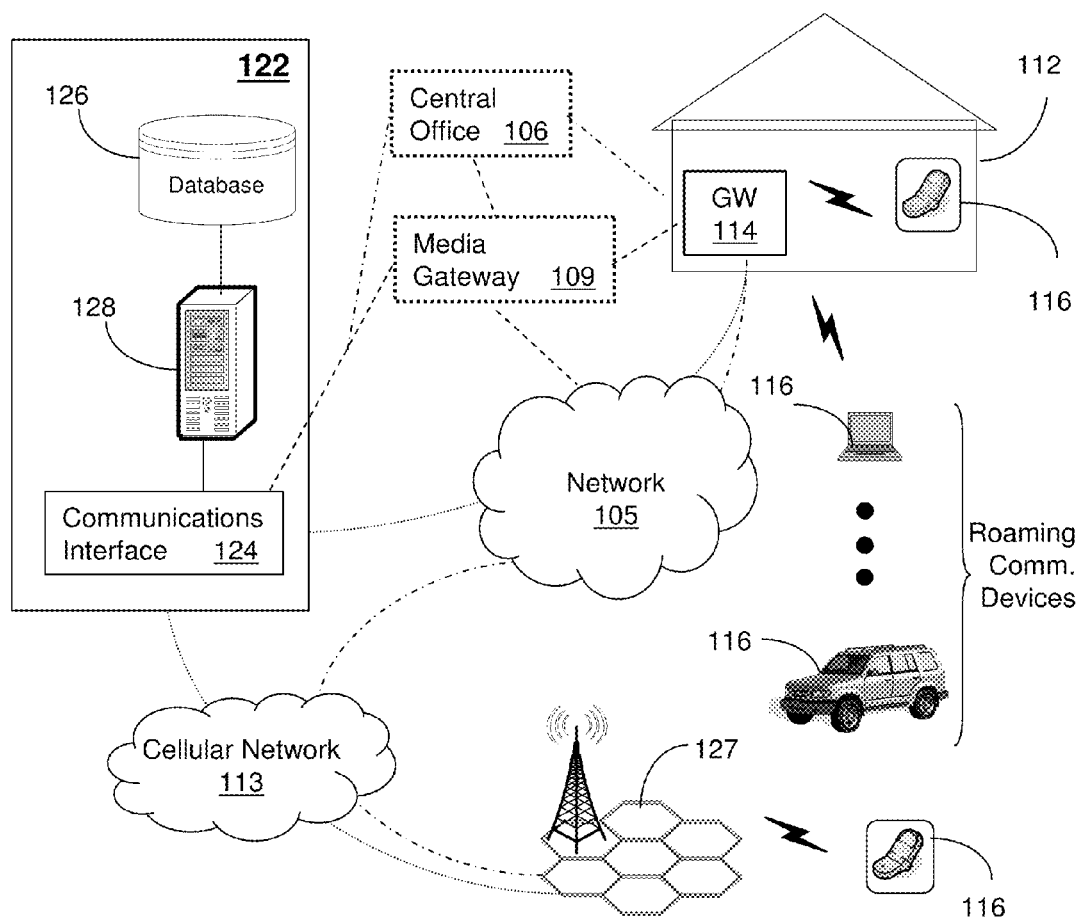
FIG. 1 depicts an exemplary embodiment of a communication system.

FIG. 1 depicts an exemplary embodiment of a mobile communication device 116 communicating by way of wireless access points (WAPs) with other communication devices and/or a network proxy or web server 122 which collectively operate in a communication system 100. The communication device 116 can be a multimode VoIP terminal. However, the present disclosure contemplates the use of other types of communication devices, including other types of voice, video and data devices. The communication system 100 can comprise a packet-switched network 105. The packet-switched network can be an Internet Service Provider (ISP) network 105. The network 105 can be coupled to the network proxy 122, the cellular network 113 and network elements located in one or more of the buildings 112 representing an enterprise or residence. The ISP network 105 can utilize common technology for transporting Internet traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

Figure 2:
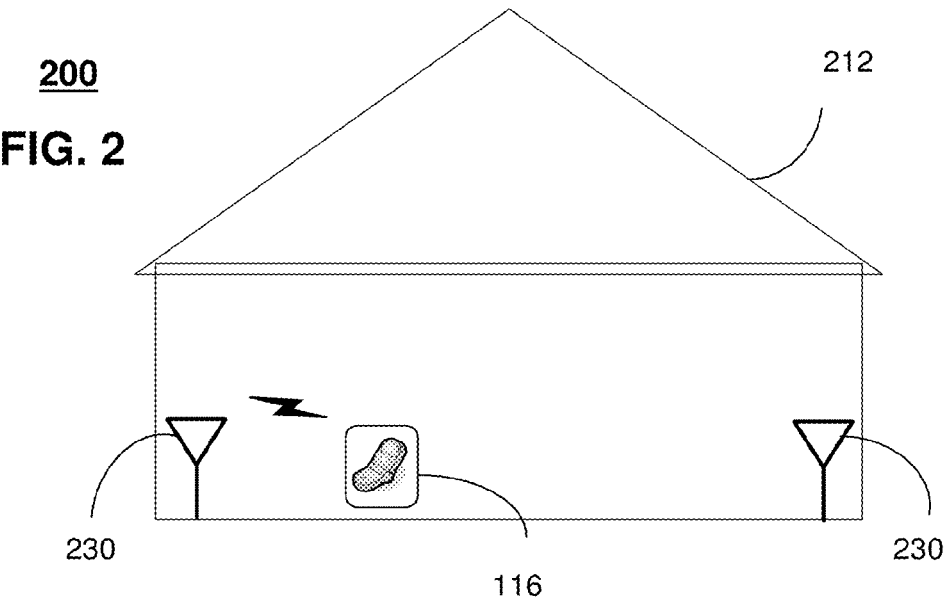
FIG. 2 depicts an exemplary embodiment of a silencing system.

FIG. 2 depicts an exemplary embodiment of a silencing system 200 embodying a RF silencing service. Silencing system 200 can be overlaid or operably coupled with communication system 100. Silencing system 200 comprises a location, illustrated in this exemplary embodiment as a building 212, where it is desirable to silence mobile communication devices 116, including audible alert functions, such as ring tones. The building 212 can include various quiet settings, such as court houses, libraries, hospitals, movie theaters, schools, churches and so on. For purposes of illustration, the quiet location will be referred to herein as building 212, but one of ordinary skill in the art would recognize that the quiet location can include other areas that may or may not be an indoor venue, such as a park or cemetery.

Building 212 can comprise one or more radio frequency (RF) transmitters 230 that transmit RF signals for receipt by communication devices 116 that are passing or are in proximity thereto. The RF transmitters 230 can have components, including integrated circuits and antennas, that provide for transmission of the RF signals at desired levels and/or desired intervals. In one embodiment, the RF transmitters 230 repeatedly transmit the RF signals.

The RF transmitter 230 can be positioned at various locations of building 212, such as at an entrance of the building. The strength or range of the RF signals can be set so that those communication devices 116 entering or in the building 212 receive the RF signal, but more remote communication devices, such as in an adjacent building or location where audible alerting functions or use of the device are permissible, do not receive the RF signal.

In one embodiment, a plurality of RF transmitters 230 are positioned at strategic locations in the building 212, such as at all of the entrances and at all of the exits. The RF transmitters 230 can be ingress transmitters and egress transmitters, where the ingress transmitters can transmit a first RF signal, such as for disabling the audible alerting function of the communication devices 116 and the egress transmitters can transmit a second RF signal, such as for enabling the audible alerting function. In another embodiment, the RF transmitters 230 can have RF receivers for receipt of RF signals from the communication devices 116 and/or separate RF receivers can be positioned in building 212 for receipt of the RF signals from the communication devices 116.

Figure 3:
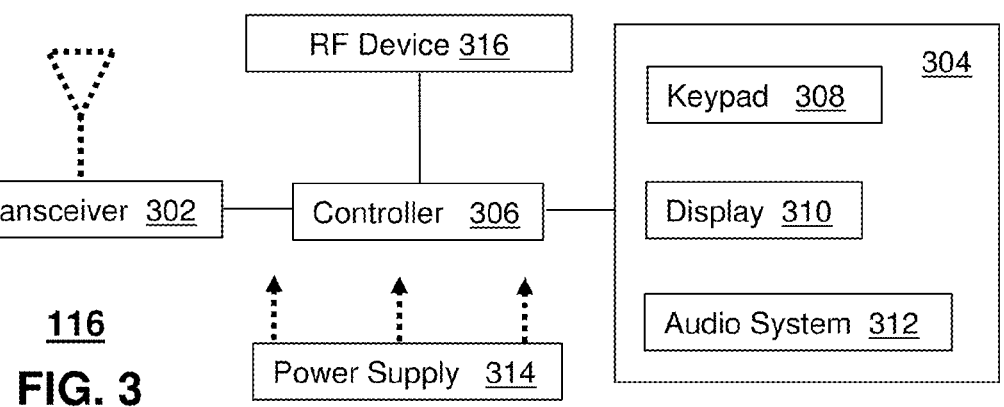
FIG. 3 depicts an exemplary block diagram of one of several embodiments for a communication device operating in the systems of FIGS. 1 and 2.

FIG. 3 depicts an exemplary embodiment of the wireless communication device 116. The communication device 116 can comprise a wireless transceiver 302, a user interface (UI) 304, a power supply 314, and a controller 306 for managing operations thereof. The transceiver 302 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, UMTS, GSM/GPRS, TDMA/EDGE, and EVDO. SDR can be utilized for accessing a public or private communication spectrum according to any number of communication protocols that can be dynamically downloaded over-the-air to the communication device 116. It should be noted also that next generation wireless access technologies can be applied to the present disclosure.

The UI 304 can include a keypad 308 with depressible or touch sensitive navigation disk and keys for manipulating operations of the communication device 116. The UI 304 can further include a display 310 such as monochrome or color LCD (Liquid Crystal Display) for conveying images to the end user of the communication device 116, and an audio system 312 that utilizes common audio technology for conveying and intercepting audible signals of the end user.

The power supply 314 can utilize common power management technologies such as replaceable batteries, supply regulation technologies, and charging system technologies for supplying energy to the components of the communication device 116 and to facilitate portable applications. In stationary applications, the power supply 314 can be modified so as to extract energy from a common wall outlet and thereby supply DC power to the components of the communication device 116. The controller 306 can utilize computing technologies such as a microprocessor and/or digital signal processor (DSP) with associated storage memory such a Flash, ROM, RAM, SRAM, DRAM or other like technologies for controlling operations of the aforementioned components of the communication device 116.

The communication device 116 can comprise a RF device 316. The RF device 316 can be integrated into the housing of the communication device 116 or can be connectable, including removably connectable, to the communication device, such as in an identity module including a subscriber identity module (SIM) card, a universal subscriber identity module (USIM) card, a removable user identification module (RUIM) card or a Willcom-SIM (W-SIM) card. The RF device 316 can have components that allow for the receipt of RF signals, including an integrated circuit and antenna. In another embodiment, the RF device 316 can be an integral part of transceiver 302.

The RF device 316 can be coupled to or in communication with the controller 306 of the communication device 116 for transmitting one or more signals to the controller. The RF 316 device can comprise components, such as a RF transmitter, that allow for the transmission of signals to other RF receivers, including remote RF receivers. In one embodiment, the RF device 316 can comprise an RFID tag or transponder. The RFID tag of RF device 316 can communicate information, including identification information associated with the communication device 116.

The RF device 316 can be an active or passive device. In one embodiment, the RF device 316 can be connected to the power supply 314 of the communication device 116. The RF device 316 can have a memory, such as for storage of data representative of receipt of one or more RF signals. The memory can be separate from the memory of the controller 306 or can be incorporated therein. In passive applications, the RF device 316 can be powered by the radiant energy of an RF signal intercepted thereby.

Figure 4:
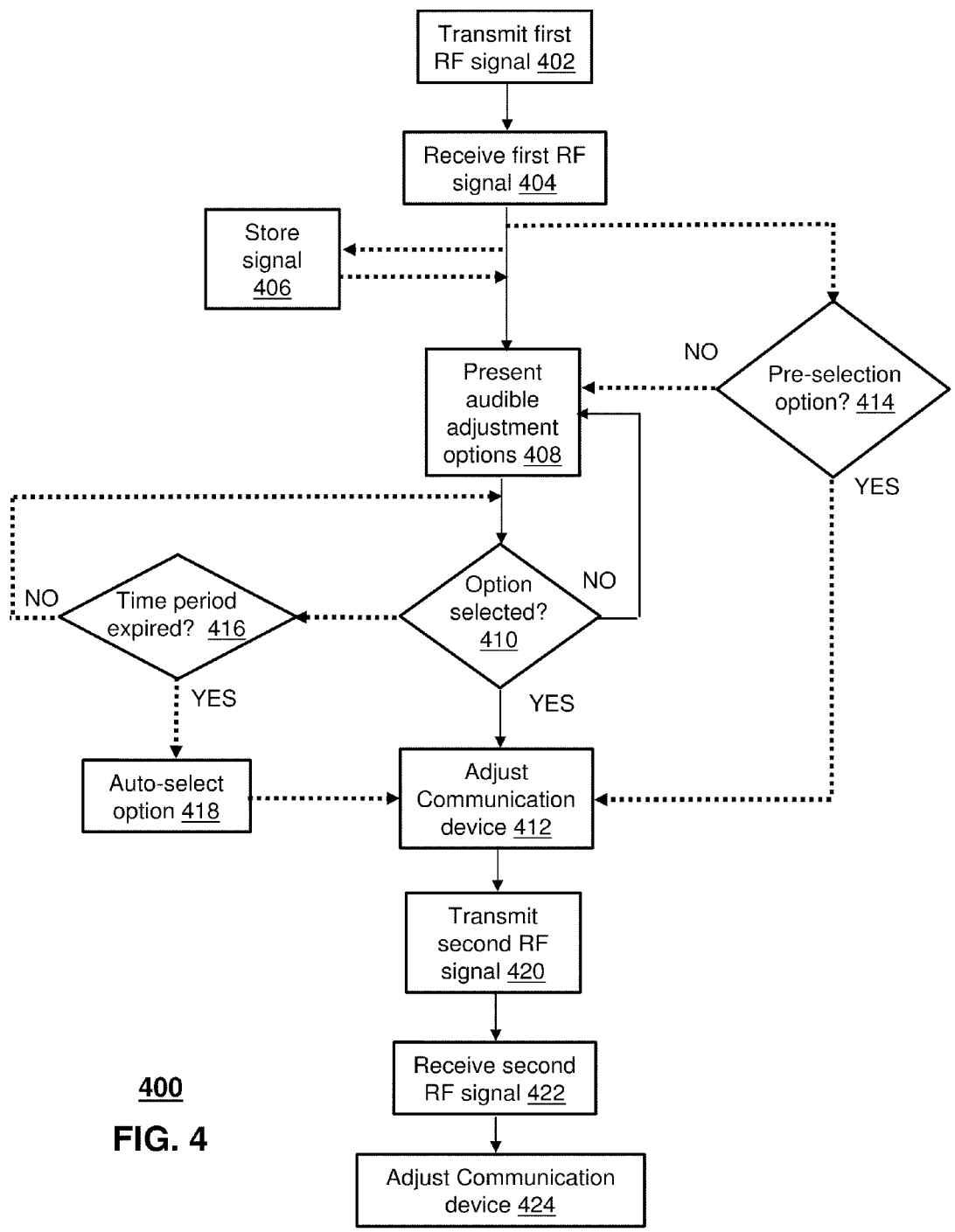
FIG. 4 depicts an exemplary method operating in portions of the systems of FIGS. 1 and 2.

FIG. 4 depicts an exemplary method 400 operating in portions of the systems 100 and 200. Method 400 has variants as depicted by the dashed lines. It would be apparent to an artisan with ordinary skill in the art that other embodiments not depicted in FIG. 4 are possible without departing from the scope of the claims described below.

Method 400 can begin with step 402 in which RF transmitter 230 can transmit a first RF signal in step 402. The frequency, duration and/or interval of the RF signal can be selected based upon a number of factors including the amount of traffic at the location and the particular environment. In step 404, a passing or targeted communication device 116 can receive the RF signal. In one embodiment, while the communication device 116 is off, i.e., in an off-state, the RF signal or data representative of receipt of the RF signal can be captured by a passive RF device 316 and stored in memory by the communication device, such as the memory of the RF device 316 and/or the memory of controller 306.

In response to the RF signal, in step 408 the communication device 116 can present to the user one or more options for silencing the communication device, including switching to a vibration and/or text mode, as well as turning the communication device to the off-state. It should be understood by one of ordinary skill in the art that the present disclosure considers turning the communication device 116 to the off-state as being an adjustment to the audible alerting function of the device, whether or not the audible alert is switched to a non-audible alert.

In step 410, the communication device 116 can determine whether the user has selected one of the silencing options. If a silencing option has been selected then in step 412 the audible alerting function of the communication device 116 can be adjusted according to the user's selection. If on the other hand, a user has not selected a silencing option, the communication device 116 can maintain the current presentation of the silencing options or can present the options again to the user. The options can be presented in a display of the communication device 116 or by other techniques, and can be presented in combination with other techniques, such as a distinctive ring tone.

In one embodiment, a user can pre-select a silencing option. After receipt of the first RF signal back in step 404, the communication device 116 can determine whether a pre-selection silencing option exists, as in step 414. If a pre-selection silencing option exists, then the audible alerting function of the communication device 116 can be adjusted according to the pre-selection, as back in step 412. If on the other hand, a pre-selection silencing option does not exist, then the communication device 116 can present the silencing options, as back in step 408.

In another embodiment, the communication device 116 can automatically select a silencing option if a user does not timely select an option. In step 416, the communication device 116 can determine whether a selection time period has expired without any selection being made. If the time period has expired, then the communication device 116 can automatically select one of the silencing options in step 418. The auto-selection can be of any of the non-audible options or can be according to a pre-selection of one of the options by a user.

A second RF signal can be transmitted by the RF transmitter 230 or a different RF transmitter in step 420 so that the communication device 116 can be switched to a non-silenced state, such as upon exiting the building 212. In step 422, the communication device 116 can receive the second RF signal and in step 422 the audible alerting function of the communication device can be adjusted in response to the receipt of the second RF signal, such as switching to a ring tone mode and/or turning the communication device to an on-state.

From the foregoing descriptions, it would be evident to an artisan with ordinary skill in the art that the aforementioned embodiments can be modified, reduced, or enhanced without departing from the scope and spirit of the claims described below. For example, the communication device 116 can automatically switch to a silent state without presenting any silencing options to a user. The communication device 116 can also present options to a user upon receipt of the second RF signal, such as switching to an audible alert or maintaining the current alert. A user can also be presented with an option, either as a pre-selection or upon receipt of an RF signal, to override any adjustment to the audible alerting function of the communication device. The first and second RF signals can be different signals that are distinguishable by the communication device 116 as instructions for silencing or non-silencing adjustments. In certain environments, these RF signals can also be the same but the communication device 116 can distinguish between an ingress signal and an egress signal based upon message content or time of receipt, such as any subsequent signal received after a pre-determined time period can be assumed to be an egress signal.

The RF silencing system 200 can be implemented through retro-fitting communication devices 116 that already have RFID tags, such as by computer technology that can instruct the controller 306 of the communication device to make the desired adjustment based upon receipt of the RF signal associated with the RFID tag. The information from the RFID tag can also be used in combination with the RF silencing system 200, such as the RFID tag indicating that a communication device 116 belongs to emergency personnel and allowing an override of the audible alerting function by that particular user.

These are but a few examples of the modifications that can be applied to the present disclosure without departing from the scope of the claims. Accordingly, the reader is directed to the claims for a fuller understanding of the breadth and scope of the present disclosure.

Figure 5:
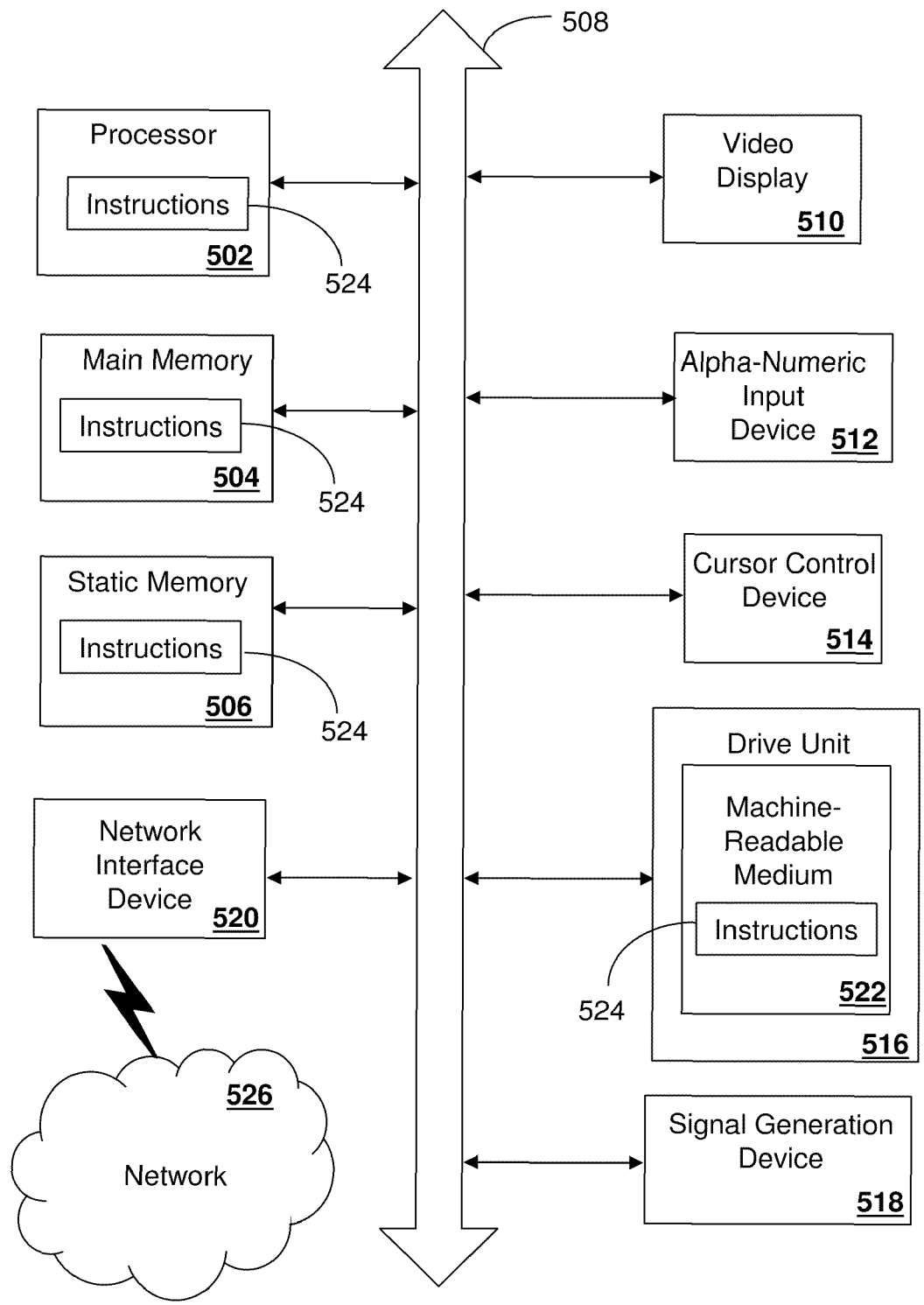
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising a controller element to:
   receive a silencing signal from an RFID device of the communication device through an electrical connection, the RFID device providing the silencing signal in response to an RF signal comprising the silencing signal received by the RFID device from a remote RF transmitter, the RFID device being powered independently from the communication device;
   present one or more silencing options in response to the silencing signal;
   receive a selection corresponding to one of the one or more silencing options; and
   adjust an audible alerting function of the communication device responsive to the selection of the one or more silencing options;
   wherein the RFID device stores the silencing signal in its memory while the communication device is in an off-state, and
   wherein the RFID device presents the silencing signal to the controller element responsive to an on-state of the communication device.

2. The communication device of claim 1, wherein the controller element presents the one or more silencing options by way of a display of the communication device.

3. The communication device of claim 1, wherein the one or more silencing options comprise at least one among a vibration mode, a text mode and an off-state of the communication device.

4. The communication device of claim 1, wherein the controller element adjusts the communication device to at least one among a vibration mode, a text mode and an off-state of the communication device when the selection of the one or more silencing options is not received in a specified time period.

5. The communication device of claim 1, wherein the RF signal is a first RF signal and wherein the controller element:
   receives a non-silencing signal from the RFID device, the non-silencing signal being provided by the RFID device in response to receipt of a second RF signal; and
   adjusts the audible alerting function of the communication device responsive to the non-silencing signal.

6. The communication device of claim 5, wherein the adjustment of the communication device responsive to the non-silencing signal comprises at least one among a ring tone mode and an on-state of the communication device.

7. The communication device of claim 1, wherein the RF signal is a first RF signal and wherein the controller element:
   receives a non-silencing signal from the RFID device, wherein the RFID device provides the non-silencing signal in response to a second RF signal;
   presents one or more non-silencing options in response to the non-silencing signal;
   receives a selection corresponding to one of the one or more non-silencing options; and
   adjusts the audible alerting function of the communication device responsive to the selection of the one or more non-silencing options.

8. The communication device of claim 1, wherein the RFID device comprises one among an active and a passive RFID device.

9. A silencing system, comprising a controller element to transmit an RF signal to an RF receiver of a mobile communication device, wherein the RF receiver is powered independently from the mobile communication device, and an audible alerting function of the mobile communication device is adjusted in response to the RF signal, wherein the RF receiver stores the silencing signal in a memory of the RF receiver in response to detecting the RF signal when the mobile communication device is in an off-state, and wherein the RF receiver presents the silencing signal through an electrical connection to the mobile communication device responsive to an on-state of the mobile communication device.

10. A silencing system, comprising a controller element to transmit an RF signal to an RF receiver of a mobile communication device, wherein an audible alerting function of the mobile communication device is adjusted in response to the RF signal, wherein the RF receiver of the mobile communication device stores a silencing signal in a memory of the RF receiver in response to detecting the RF signal when the mobile communication device is in an off-state, and wherein the RF receiver presents the silencing signal to the mobile communication device responsive to an on-state of the mobile communication device.

11. The silencing system of claim 10, wherein the audible alerting function of the mobile communication device is adjusted to one among a vibration mode, a text mode and an off-state of the mobile communication device when the selection of the one or more silencing options is not received in a specified time period.

12. The silencing system of claim 9, wherein the RF signal corresponds to a silencing request, and wherein the mobile communication device is silenced based at least in part on a pre-selection of silencing options comprising at least one among a vibration mode, a text mode and an off-state of the mobile communication device.

13. The silencing system of claim 9, wherein the RF signal corresponds to a nonsilencing signal, and wherein the audible alerting function of the mobile communication device is adjusted in response to said non-silencing signal.

14. The silencing system of claim 13, wherein the audible alerting function of the mobile communication device is adjusted to at least one among a ring tone mode and an on-state of the mobile communication device in response to the non-silencing signal.

15. The silencing system of claim 9, wherein the RF receiver comprises one among an active RFID device and a passive RFID device.

16. An RFID device of a mobile communication device, comprising a controller element to:
   receive an RF signal comprising a silencing signal from a remote RF transmitter; and
   provide the silencing signal to the mobile communication device through an electrical connection in response to the RF signal, wherein the RFID device is powered independently from the mobile communication device, and an audible alerting function of the mobile communication device is silenced in response to the silencing signal, wherein the silencing signal is stored in a memory of the RFID device when the mobile communication device is in an offstate, and wherein the RFID device presents the silencing signal to the mobile communication device responsive to an on-state of the mobile communication device.

17. The RFID device of claim 16, wherein the RF signal is a first RF signal and wherein the controller element:

receives a second RF signal; and provides a non-silencing signal to the mobile communication device in response to the second RF signal, wherein the audible alerting function of the mobile communication device is adjusted in response to the non-silencing signal.

18. The RFID device of claim 17, wherein the audible alerting function of the mobile communication device is adjusted to at least one among a ring tone mode and an on-state of the mobile communication device in response to the non-silencing signal.

19. The RFID device of claim 16, wherein one or more silencing options are presented by way of a display of the mobile communication device.

20. The RFID device of claim 19, wherein the one or more silencing options comprise at least one among a vibration mode, a text mode and an off-state of the mobile communication device.

* * * * *